United States Patent Office 3,284,421
Patented Nov. 8, 1966

3,284,421
MODIFYING POLYMERS
David S. Breslow, Wilmington, Del., assignor to Hercules Incorporated, a corporation of Delaware
No Drawing. Filed June 20, 1963, Ser. No. 289,427
The portion of the term of the patent subsequent to Oct. 12, 1982, has been disclaimed
20 Claims. (Cl. 260—80.5)

This application is a continuation-in-part of my copending applications Serial No. 172,815, filed February 12, 1962, now Patent No. 3,211,752, and Serial No. 247,878, filed December 28, 1962, now abandoned.

This invention relates to modifying polymers and to the products so produced. More particularly, the invention relates to modifying polymers with azidoformate compounds and the products so produced.

In the past, industry has depended almost entirely upon sulfur or sulfur-bearing materials as vulcanizing, i.e., cross-linking, agents. It has more recently been discovered that certain types of organic peroxides or azo compounds are capable of acting as vulcanizing agents. However, all of the above agents suffer the drawback that because of their mode of action they are not equally effective in cross-linking all types of polymers. For example, polybutadiene is effectively vulcanized by peroxides while butyl rubber or crystalline polypropylene are not.

Now in accordance with this invention it has unexpectedly been found that a number of polymers can be cross-linked by nonvolatile azidoformate compounds to produce vulcanizates that are tough, resilient, solvent resistant, and odor free. In addition, it has been found that the polymers can be treated with smaller amounts of the azidoformates to improve their properties without materially affecting their solubility.

The azidoformates used in accordance with this invention are solids or oils having a boiling point of at least about 100° C. at a pressure of 70 mm. of mercury and having the general formula $$R(OCN_3)_x$$
$$\phantom{R(O}\|\phantom{CN_3)_x}$$
$$\phantom{R(OC}O\phantom{N_3)_x}$$

where $x$ is at least 1, preferably from about 1 to about 100, and R is an organic radical, inert to modification reactions, containing at least one carbon atom per azidoformate group. Exemplary of the azidoformates used are the alkyl azidoformates such as n-octadecyl azidoformate, tetramethylene-bis(azidoformate), pentamethylene-bis(azidoformate); the cyclic alkyl azidoformates such as 1,4-cyclohexanedimethyl-bis(azidoformate), 2-(1-p-methyl-8-yloxy)ethyl azidoformate; 2 - norborn-5-enyl methylene azidoformate; the aralkyl azidoformates such as $\alpha,\alpha'$-p-xylylene-bis(azidoformate); the aromatic azidoformates such as phenyl azidoformate, 2,2-isopropylidene-bis(p,p'-phenyl azidoformate); the azidoformate ethers such as 2,2'-oxydiethyl-bis(azidoformate), 2,2'-oxydipropyl-bis(azidoformate), 2,2'-ethylenedioxydiethyl-bis(azidoformate), the tetraazidoformate of pentaerylthritol-propylene oxide adduct having the general formula

the azidoformate thioethers such as 2,2'-thiodiethyl-bis(azidoformate), 4,4'-thiodibutyl-bis(azidoformate); etc. It will, of course, be obvious to those skilled in the art that still other azidoformates containing functional groups, which are inert to modification reactions, such as halogen, COOR,

etc., groups, are included in the above definition. In addition to their ability to cross-link, the azidoformates can be synthesized so as to contain groups which will affect other changes in the polymers treated. Thus it is possible by means of this invention to bond, directly to the polymers, dyes, stabilizers, flameproofing agents, antistatic agents, ultraviolet screening agents, etc. This can be done by using a compound which has been synthesized to contain both a color, stability, etc., causing group and at least one azidoformate group. Exemplary of such compounds are 3-hydroxy-4-benzoylphenyl azidoformate (an ultraviolet screening agent), p-phenylazophenyl azidoformate (a dye), 3,5-di-tert-butyl-4-hydroxybenzyl azidoformate (an antioxidant), the phosphate ester of p-hydroxyphenyl azidoformate (a flame-proofing agent), etc.

The azidoformates used in this invention can be prepared in various ways as, for example, by reacting a chloroformate with an excess, i.e., from about 1.05 moles to about 10 moles per equivalent of chloroformate, of an alkali azide. The preparation of the azidoformates is further described in my copending application Serial No. 172,815, filed February 12, 1962.

Any types of hydrocarbon poymer, including saturated, unsaturated, linear atactic, crystalline, or nonlinear amorphous polymers, copolymers, terpolymers, etc., as, for example, polyethylene, polypropylene, polystyrene, styrene-butadiene rubber, butyl rubber, natural rubber, polybutadiene, polyisobutylene, ethylene-propylene copolymer, cis-1,4-polyisoprene, ethylene-propylene-dicyclopentadiene terpolymer, etc., and blends of these polymers with each other or nonhydrocarbon polymers can be modified with any azidoformate provided it has a boiling point of at least about 100° C. at a pressure of 70 mm. of mercury. In addition to the hydrocarbon polymers, a large number of nonhydrocarbon polymers including copolymers, terpolymers, etc., can also be modified with the new azidoformates. Typical of these nonhydrocarbon polymers are the cellulose esters such as cellulose acetate butyrate; the cellulose partial alkyl ethers such as hydroxyethyl and hydroxypropyl cellulose; polyesters such as poly(ethylene terephthalate), drying and non-drying alkyd resins, etc.; the poly(alkylene oxides) such as poly(ethylene oxide) and poly(propylene oxide); the polyamides such as nylon, Perlon-L, etc.; allyl pentaerythritol derivatives such as the condensate of triallyl pentaerythritol with diallylidene pentaerythritol, esters of triallyl pentaerythritol and drying oil fatty acids, etc.; the poly(vinyl alkyl ethers) such as poly(vinyl methyl ether), etc.; the poly(vinyl acetals) such as poly(vinyl butyral), etc.; the vinyl chloride polymers containing at least 10 mole percent of vinyl chloride such as poly(vinyl chloride), vinyl chloride-vinyl acetate copolymers, vinyl chloride-vinylidene chloride copolymers, vinyl chloride-maleic anhydride copolymers, vinyl chloride-fumaric acid copolymers, vinyl chloride-vinyl acetal copolymers such as the vinyl chloride-vinyl butyral copolymers, vinyl chloride-vinylidene chloride-acrylonitrile terpolymers, vinyl chloride-vinyl acetate-maleic anhydride terpolymers, etc.; nitrocellulose; chlorinated natural rubber; sulfochlorinated polyethylene; polysulfide rubber; polyurethane rubber; poly(vinyl acetate); ethylene-vinyl acetate copolymers; poly(vinylidene chloride); vinylidene chloride-acrylonitrile copolymers; ethyl acrylate–2-chloroethyl vinyl ether copolymers; poly(ethyl acrylate); poly(ethyl methacrylate; poly[3,3 - bis(chloromethyl)oxetane]; vinyl modified polydimethyl siloxane; polychloroprene; butadiene-acrylonitrile copolymers; etc.

The modification process can be carried out by either heating the polymer plus the azidoformate compound above its decomposition temperature or by exposing the polymer plus the azidoformate to irradiation. The temperature at which cross-linking or other modification is effected can be varied over a wide range. When it is effected by heating, the temperature will be in the range of from about 70° C. to about 350° C. Cross-linking or other modification effected by irradiation is independent of temperature and can be performed at or below room temperature. The rate of the reaction depends on the intensity of the light source and the distance of the polymer therefrom. The wave lengths used will generally be in the range of from 1 A. to about 5800 A. and most preferably from about 2000 A. to about 3000 A. These can be supplied by sources such as high and low pressure mercury lamps, cathode ray tubes, etc. Photosensitizers can be added to increase the absorption. Various amounts of azidoformate can be added, the optimum amount depending on the amount of cross-linking or other modification desired, the specific azidoformate compound employed, etc. For example, in some cases such as in certain film applications, it may be desirable to merely add a sufficient amount of azidoformate compound to strengthen the polymer or polymer blend without materially affecting its solubility. In general, the amount added, based on the weight of the polymer, will be from about 0.01% to about 20%. In some cases, it may be desirable to add a small amount, i.e., from about 0.01% to about 1.0% of sulfur which seems to act as a co-agent for the azidoformates.

The azidoformate can be incorporated in the polymer in any desired fashion; for example, it can be uniformly blended by simply milling on a conventional rubber mill or dissolved in a solution containing the polymer. By either means it is distributed throughout the polymer and uniform cross-linking or other modification is effected when the blend is either subjected to heat or irradiation. Other means of mixing the azidoformate with the polymer will be apparent to those skilled in the art.

In addition to the azidoformate, other ingredients can also be incorporated. The additives commonly used in rubber vulcanizates can be used here also, as, for example, extenders, fillers, pigments, plasticizers, stabilizers, etc. When modification is effected by irradiation, additives should be used in amounts which do not inhibit the passage of the radiation. Obviously, there are many cases in which a filler is not required or desired, and excellent results are achieved when only the azidoformate is added.

The following examples are presented to illustrate the process of cross-linking or otherwise modifying polymers with azidoformates, parts and percentages being by weight unless otherwise specified. In some of the examples the extent of cross-linking is determined by analysis for percent gain in insolubility in solvents in which the uncross-linked polymer was soluble and for the degree of swell therein, hereinafter termed "percent gel" and "percent swell." Percent gel is indicative of the percentage of polymer that is cross-linked and percent swell is inversely proportional to the cross-link density. Percent gel and swell are determined as follows: A weighed sample of cross-linked polymer is soaked in a solvent, in which the uncross-linked polymer was soluble, at an elevated temperature for a specified length of time. The sample is then removed, blotted on filter paper so as to remove the solvent on the surface and weighed at once. The swollen sample is then dried to constant weight. The weights of initial and final sample are corrected for polymer and copolymer content based on knowledge of components. From these figures $$\frac{\text{Corrected dry weight}}{\text{Corrected initial weight}} \times 100 = \text{percent gel}$$

$$\frac{\text{Corrected swollen weight} - \text{Corrected dry weight}}{\text{Corrected dry weight}} \times 100 =$$

percent swell

The molecular weight of some of the polymers cross-linked or otherwise modified in the examples can be indicated by their reduced specific viscosity (RSV). By the term "reduced specific viscosity" is meant the $\eta_{sp}/C$ determined on an 0.1% solution (0.1 g. of the polymer per 100 ml. of solution) of the polymer at elevated temperature.

EXAMPLES 1–10

Ten samples of elastomeric ethylene-propylene copolymers were cross-linked with different azidoformates as follows: In each example the copolymer and azidoformate were codissolved in carbon tetrachloride and then the solvent was allowed to evaporate overnight at room temperature. Each mixture was cured by heating in a closed iron mold for one hour at a temperature of 160° C. The resulting vulcanizates were odorless and had not disclosed. The specific azidoformate used, the amount of each azidoformate used, the mole percent of propylene and RSV of the ethylene-propylene copolymer and the percent gel of the resulting vulcanizate, as determined in toluene at 80° C., are tabulated in Table I.

*Table 1*

| Example | Mole Percent Propylene | RSV* | Azidoformate | Parts/100 Parts of Copolymer | Percent Gel |
| --- | --- | --- | --- | --- | --- |
| 1 | 29 | 4.0 | Tetramethylene-bis(azidofromate) | 7 | 85 |
| 2 | 29 | 4.0 | 2,2'-oxydiethyl-bis(azidoformate) | 5 | 87 |
| 3 | 29 | 4.0 | 2,2'-ethylenedioxydiethyl-bis(azidorformate) | 5 | 81 |
| 4 | 31 | 1.9 | 2,2'-oxydipropyl-bis(azidoformate) | 5 | 83 |
| 5 | 31 | 1.9 | 2,2'-thiodiethyl-bis(azidoformate) | 6 | 76 |
| 6 | 31 | 1.9 | Pentamethylene-bis(azidoformate) | 10 | 88 |
| 7 | 31 | 1.9 | n-Octadecyl azidoformate | 17 | 76 |
| 8 | 31 | 1.9 | α,α'-p-Xylylene-bis(azidoformate) | 5 | 90 |
| 9 | 31 | 1.9 | $C(CH_2-O-CH_2\overset{CH_3}{\underset{\phantom{|}}{C}}H-O-\overset{O}{\underset{\phantom{|}}{C}}N_3)_4$ | 5 | 66 |
| 10 | 31 | 1.9 | 2,2-isopropylidene-bis(p,p'-phenyl azidoformate) | 5 | 89 |

*As determined in decahydronaphthalene at a temperature of 135° C.

EXAMPLES 11–20

Ten samples of different elastomeric polymers were cross-linked with tetramethylene-bis(azidoformate). The formulation of each sample was as follows:

|   | Parts |
| --- | --- |
| Elastomeric polymer | 100 |
| High abrasion furnace black | 50 |
| Tetramethylene-bis(azidoformate) | 5.0 |

Each formulation was compounded on a two roll mill by conventional rubber procedure and then cured in a preheated aluminum mold at a temperature of 155° C. for 45 minutes. The resulting vulcanizates were odorless. The properties of the vulcanizates were determined and are set forth in Table II.

a pressure of 800 p.s.i. The resulting vulcanizates were odorless. The specific polymers cross-linked, the amounts of azidoformate cross-linking agent used, the time and temperature of the curing cycle, the percent gel and con-

*Table II*

| Examples | Elastomeric Polymer | Tensile Strength, p.s.i. | Modulus at 100% Elongation, p.s.i. | Elongation, Percent | Shore A Hardness |
|---|---|---|---|---|---|
| 11 | Polyethylene (density 0.923, melt index 2.1, ASTM D1238). | 2,765 | 2,385 | 135 | 96 |
| 12 | Natural rubber (smoked sheet). | 3,595 | 415 | 320 | 66 |
| 13 | Cis-1,4-polyisoprene (containing 92.6% of the cis monomer). | 2,800 | 430 | 300 | 67 |
| 14 | Styrene-butadiene copolymer (containing 23.5% of bound styrene). | 2,925 | 430 | 275 | 68 |
| 15 | Isobutylene-isoprene copolymer (containing 2.25 mole % of isoprene). | 1,275 | 210 | 370 | 47 |
| 16 | Cis-1,4-polybutadiene (containing 91% of the cis monomer). | 1,440 | 520 | 140 | 73 |
| 17 | Butadiene-acrylonitrile copolymer (containing 26 mole % of acrylonitrile). | 2,985 | 750 | 205 | 69 |
| 18 | Vinyl modified polydimethyl-siloxane. | 500 | 175 | 215 | 45 |
| 19 | Polychloroprene (sulfur free). | 3,455 | 1,510 | 170 | 79 |
| 20 | Sulfochlorinated polyethylene (containing 29% by weight of chlorine, and 1.25% by weight of sulfur, density 1.10). | 2,015 | 1,080 | 165 | 72 |

EXAMPLES 21–28

Eight samples of different polymers were cross-linked with tetramethylene-bis(azidoformate). Each sample in the form of flakes was slurried in acetone at a concentration of 1 gram of polymer per ml. of acetone. To each slurry was added the desired amount of azidoformate cross-linking agent dissolved in chloroform. Each mixture was agitated and then the acetone and chloroform removed by evaporation at a temperature of between 50° and 70° C. The resulting dry mixtures were further mixed and blended to thoroughly distribute the azidoformate through the polymers. Each mixture was cured in an aluminum mold at elevated temperature under ditions under which the percent gel was determined are set forth in Table III.

*Table III*

| Examples | Polymer | Parts of cross-linking agent/100 parts of polymer | Curing temperature, °C. | Curing time, minutes | Percent gel | Conditions for gel determination |
|---|---|---|---|---|---|---|
| 21 | Poly(vinyl chloride) (Sp. Viscosity 0.55, determined on a 4% solution in nitrobenzene at 20° C.). | 5 | 170 | 10 | 84.0 | 4 hours at 50° C. in methylethyl ketone. |
| 22 | Polyethylene (density 0.942, melt index 0.6, ASTM D1238). | 2 | 170 | 10 | 95.7 | 16 hours at 140° C. in decahydronaphthalene. |
| 23 | Polyethylene (density 0.962, melt index 0.8, ASTM D1238). | 2 | 170 | 10 | 96.0 | 16 hours at 140° C. in decahydronaphthalene. |
| 24 | Polypropylene (density 0.905, birefringent M.P. 167° C.). | 2 | 195 | 5 | 99.0 | 16 hours at 140° C. in decahydronaphthalene. |
| 25 | Polymeric 3,3-bis(chloromethyl)oxetane (birefringent M.P. 186.7° C.). | 5 | 210 | 5 | 91.0 | 16 hours at 100° C. in cyclohexanone. |
| 26 | Poly(ethylene oxide) (RSV 6.3 as determined in chloroform at 25° C.). | 5 | 150 | 30 | 75.5 | 4 hours at 60° C. in water. |
| 27 | Chlorinated natural rubber (67% by weight chlorine, viscosity 130 cp. as determined on a 20% solution in toluene at 25° C.). | 5 | 135 | 70 | 88.0 | 4 hours at 25° C. in a mixture of 2 parts benzene and 1 part n-hexane. |
| 28 | Hydroxyethyl cellulose (degree of substitution 2.5). | 5 | 150 | 30 | 64.2 | 4 hours at 60° C. in water. |

EXAMPLES 29–33

Five samples of different polymers were cross-linked with tetramethylene-bis(azidoformate). Each polymer was dissolved in an organic solvent and the desired amount of tetramethylene-bis(azidoformate) dissolved in chloroform was added with agitation. The specific polymers, their organic solvents and the amounts of azidoformate cross-linking agent added are tabulated below:

| Example | Polymer | Organic solvent | Parts of cross-linking agent/100 parts of polymer |
|---|---|---|---|
| 29 | Poly(vinyl acetate) (viscosity 900 cp. as determined on a molar solution in benzene at 25° C.). | Methanol | 5 |
| 30 | Polystyrene (mol. wt. 300,000). | Benzene | 2 |
| 31 | Poly(ethyl acrylate) (RSV 1.86 as determined in ethylene dichloride at 25° C.). | Methylethyl ketone | 2 |
| 32 | Cellulose acetate butyrate (containing 13% acetyl and 37% butyryl). | Acetone | 5 |
| 33 | Poly(vinyl methyl ether) (RSV 13.9 as determined in chloroform at 25° C., 27% crystalline). | Benzene | 2 |

The above solutions were agitated automatically for 16 hours and then the solvents were removed by evaporation at a temperature of between 50° and 70° C. Each sample was cured in an aluminum mold at elevated temperature under a pressure of 800 p.s.i. The resulting vulcanizates were odorless. The specific polymers crosslinked, the time and temperature of the curing cycle, the percent gel and conditions under which the precent gel was determined are set forth in Table IV.

|  | Parts |
|---|---|
| Natural rubber (smoked sheet) | 50 |
| Ethylene-propylene copolymer | 50 |
| High abrasion furnace black | 51 |
| Tetramethylene-bis(azidoformate) | 1.5 |
| Sulfur | 0.175 |

*Table IV*

| Examples | Polymers | Curing temperature, °C. | Curing time, minutes | Percent gel | Conditions for gel determination |
|---|---|---|---|---|---|
| 29 | Poly(vinyl acetate) | 170 | 10 | 97.5 | 4 hours at 60° C. in ethylene dichloride. |
| 30 | Polystyrene | 150 | 30 | 95.0 | 16 hours at 25° C. in benzene. |
| 31 | Poly(ethyl acrylate) | 170 | 10 | 87.6 | 4 hours at 60° C. in methylethyl ketone. |
| 32 | Cellulose acetate butyrate | 150 | 25 | 85.0 | 4 hours at 25° C. in acetone. |
| 33 | Poly(vinyl methyl ether) | 182 | 12 | 99.0 | 7 hours at 66° C. in benzene. |

EXAMPLE 34

A sample of an ethylene-propylene-dicyclopentadiene terpolymer, containing 64.3 mole percent of ethylene, 33.3 mole percent of propylene and 2.4 mole percent of dicyclopentadiene and having an RSV of 1.9, as determined in decahydronaphthalene at a temperature of 135° C., was cross-linked with 2 parts per hundred of tetramethylene-bis(azidoformate). The azidoformate was incorporated in the terpolymer as described in Examples 1–10 and then the mixture was cured in a closed iron mold at 143° C. for 45 minutes. The resulting vulcanizate was odorless and had not discolored. It had a percent gel of 90 as determined in toluene at a temperature of 80° C.

EXAMPLES 35 AND 36

Two samples of a polyisobutylene having a molecular weight of 100,000 were cross-linked with tetramethylene-bis(azidoformate). The formulation of each sample was as follows:

|  | Examples | |
|---|---|---|
|  | 35 | 36 |
|  | Parts | Parts |
| Polyisobutylene | 100 | 100 |
| High abrasion furnace black | 50 | 50 |
| Tetramethylene-bis (azidoformate) | 2.5 | 2.5 |
| Sulfur |  | 1.0 |

Each formulation was compounded on a two roll mill at a temperature of 27° C. for 25 minutes and then cured at 155° C. for 45 minutes in a closed iron mold. The resulting vulcanizates were odorless. The gel and swell percentages were determined in toluene at a temperature of 80° C. and are tabulated below:

|  | Examples | |
|---|---|---|
|  | 35 | 36 |
| Percent gel | 100 | 100 |
| Percent swell | 355 | 237 |

EXAMPLE 37

A blend of natural rubber and an ethylene-propylene copolymer containing 40 mole percent propylene and having an RSV of 2.3, as determined in decahydronaphthalene at a temperature of 135° C., were covulcanized. The following ingredients were compounded on a two roll mill at a temperature of from 70–75° C. for 20 minutes.

The resulting mixture were cured in a closed iron mold at a temperature of 155° C. for 30 minutes. The resulting vulcanizate was odorless. The properties of the vulcanizate were as follows:

| Tensile strength, p.s.i. | 2880 |
|---|---|
| Modulus at 300% elongation, p.s.i. | 1725 |
| Elongation, percent | 400 |
| Shore A hardness | 66 |
| Break set, percent | 10 |

EXAMPLES 38 AND 39

Two samples of an ethylene-propylene copolymer, containing 40 mole percent propylene and having an RSV of 2.3, as determined in decahydronaphthalene at a temperature of 135° C., were cross-linked with tetramethylene-bis(azidoformate). The formulation of each example was as follows:

|  | Examples | |
|---|---|---|
|  | 38 | 39 |
| Ethylene-propylene copolymer | 100 | 100 |
| High abrasion furnace black | 45 | 45 |
| Tetramethylene-bis(azidoformate) | 10 | 10 |
| Sulfur | 0 | 0.5 |

The ingredients were compounded on a two roll mill at a temperature of 38° C. for 30 minutes and then cured in a preheated mold at a temperature of 155° C. for 45 minutes. The resulting vulcanizates were odorless. The tensile strength of each vulcanizate is tabulated below:

|  | Examples | |
|---|---|---|
|  | 38 | 39 |
| Tensile strength, p.s.i. | 2,895 | 3,320 |

EXAMPLE 40

A sample of an ethylene-propylene copolymer, containing 32 mole percent propylene and having an RSV of 2.1 as determined in decahydronaphthalene at a temperature of 135° C., was cross-linked with 5 parts per hundred of 2-(1-p-menthyl-8-yloxy)ethyl azidoformate. The copolymer and azidoformate cross-linking agent were compounded on a two roll mill at a temperature of from 60–75° C. The resulting mixture was cured in a preheated compression type mold at a temperature of 150° C. for 45 minutes. The resulting vulcanizate had a pleasant pine odor and had not discolored. It had a percent gel of 79 as determined in toluene at a temperature of 80° C.

EXAMPLE 41

A sample of an ethylene-propylene copolymer, containing 30 mole percent propylene and having an RSV of 2.1, as determined in decahydronaphthalene at a temperature of 135° C., was cross-linked with 1,4-cyclohexanedimethyl-bis(azidoformate). The following ingredients were compounded on a two roll mill at a temperature of 38° C. for 30 minutes.

| Ingredients: | Parts |
|---|---|
| Ethylene-propylene copolymer | 100 |
| High abrasion furnace black | 50 |
| 1,4-cyclohexanedimethyl-bis(azidoformate) | 2 |
| Polymerized trimethyl dihydroquinoline (antioxidant) | 0.5 |
| Sulfur | 0.175 |

The resulting mixture were cured in a closed iron mold at a temperature of 150° C. for 30 minutes. The properties of the vulcanizate were as follows:

| | |
|---|---|
| Tensile strength, p.s.i. | 2250 |
| Modulus at 300% elongation, p.s.i. | 1460 |
| Elongation, percent | 415 |
| Shore A hardness | 69 |
| Break set, percent | 15 |

EXAMPLES 42–45

Adhesive compositions were prepared from an atactic polypropylene having an RSV of 2.25 and an amorphous ethylene-propylene copolymer containing 33 mole percent propylene and having an RSV of 2.2  In each case, RSV was determined in decahydronaphthalene at a temperature of 135° C. The formulation of each example was as follows:

| | Examples | | | |
|---|---|---|---|---|
| | 42 | 43 | 44 | 45 |
| | Parts | Parts | Parts | Parts |
| Polypropylene | 100 | 100 | | |
| Ethylene-propylene copolymer | | | 100 | 100 |
| n-Heptane | 700 | 700 | 700 | 700 |
| Mixed tetra-, di-, and dehydroabietyl alcohols | 200 | 200 | 200 | 200 |
| Tetramethylene-bis(azidoformate) | 10 | | 10 | |

The dry ingredients were codissolved in the n-heptane with agitation at room temperature. Each adhesive composition was tested by bonding compression molded 120-mil sheets of crystalline polypropylene (RSV 3.25 as determined in decahydronaphthalene at a temperature of 135° C.) as follows: From the crystalline polypropylene sheets were cut 1 by 2 inch specimens. Each specimen was swabbed with heptane and then coated with 50 mils (wet) of adhesive composition. The coated specimens were air dried at room temperature for 5 minutes, then at a temperature of 80° C. for 10 minutes and again at room temperature for 30 minutes. Contact bonds were formed by overlapping two coated surfaces 1 square inch under a pressure of 5 p.s.i. and a temperature of 133° C. for two hours. The bonded specimens were conditioned for one hour at room temperature (still under a pressure of 5 p.s.i.) and then tested for lap shear bond strength and creep. The results of the tests are tabulated below:

EXAMPLE 46

A sample of the poly(ethylene oxide) described in Example 26 was treated with 2 parts per hundred of tetramethylene bis(azidoformate). The azidoformate was incorporated in the polymer and the mixture cured as described in Example 26. A control sample of the poly(ethylene oxide) was cured in the same way except no azidoformate was added. The two samples thus cured were examined for strength and solubility. Both samples were clear films of approximately 5 mils thickness. The untreated sample had a tendency to be brittle and break easily while the treated sample had a greater elongation capacity and was considerably stronger. Both samples dissolved in water at 50° C., the treated sample leaving only a slight residue of insoluble material. It can be seen from the above example that azidoformate cross-linking agents can be used to impart strength to films without materially affecting their solubility, thus demonstrating utility in the field of packaging applications with water-soluble films.

EXAMPLES 47–50

Four samples of different coating compositions were cross-linked with 2,2-isopropyl bis(p,p'-phenylazidoformate). The formulation of each sample is tabulated below.

EXAMPLE 47

| Ingredients: | Parts |
|---|---|
| Nitrocellulose, RS, ½ sec. | 7 |
| Pentaerythritol-phthalic anhydride-coconut oil alkyd resin | 21 |
| Azidoformate | 3 |
| Toluene | 32 |
| Ethyl alcohol | 10 |
| Butyl acetate | 15 |
| Ethyl acetate | 15 |

EXAMPLE 48

| Ingredients: | |
|---|---|
| Glycerin-phthalic anhydride-soybean oil alkyd resin | 70 |
| Mineral spirits | 30 |
| Azidoformate | 10 |

EXAMPLE 49

| Ingredients: | |
|---|---|
| Glycerin-phthalic anhydride-soybean oil-castor oil alkyd resin | 65 |
| Xylene | 35 |
| Azidoformate | 6.5 |

EXAMPLE 50

| Ingredients: | |
|---|---|
| Diallylidene pentaerythritol-triallyl pentaerythritol reaction product | 100 |
| Phenyl β-naphthylamine (antioxidant) | 2 |
| Azidoformate | 10 |

Each coating composition was spread on a glass plate, allowed to air dry at room temperature and then was baked at a temperature of 125° C. for 1 hour. Four control samples were prepared and treated exactly the same way except the azidoformate was omitted from each formulation. The four coatings prepared with azidoformate and the four control samples were all tested for

| | Examples | | | |
|---|---|---|---|---|
| | 42 | 43 | 44 | 45 |
| Lap shear bond strength,[1] p.s.i. | 390 | 60 | 145 | 20. |
| Creep [2] | >2 weeks [3] | 3.5 min | >2 weeks [3] | 3.0 min. |

[1] Measured by ASTM D1002 using an Instron tester at a loading rate of 20 inches per minute.
[2] Measured by loading bonded specimens in tension with 500 grams dead weight at a temperature of 80° C. and noting the time to bond failure.
[3] Discontinued after 2 weeks with no visible evidence of bond failure.

cross-linking by determining their solubility in an excess of butyl acetate. The four coatings prepared with azidoformate were insoluble after soaking for 18 hours. The four controls rapidly dissolved in the butyl acetate.

EXAMPLE 51

A blend of a styrene-butadiene copolymer containing 23.5 mole percent styrene and an ethylene-propylene copolymer containing 30 mole percent propylene and having an RSV of 2.1, as determined in decahydronaphthalene at a temperature of 135° C., were covulcanized. The following ingredients were compounded on a two roll mill at a temperature of 70–75° C. for 20 minutes.

| Ingredients: | Parts |
|---|---|
| Styrene-butadiene copolymer | 50 |
| Ethylene-propylene copolymer | 50 |
| High abrasion furnace black | 50 |
| Polymerized trimethyl dihydroquinoline (antioxidant) | 0.5 |
| Sulfur | 0.14 |
| Tetramethylene-bis(azidoformate) | 1.5 |

The mixture was cured in a closed iron mold at a temperature of 150° C. for 45 minutes. The resulting vulcanizate was odorless and exhibited the following properties:

| | |
|---|---|
| Tensile strength, p.s.i. | 2360 |
| Modulus at 300% elongation, p.s.i. | 1085 |
| Elongation, percent | 565 |
| Shore A hardness | 61 |
| Break set, percent | 25 |

EXAMPLE 52

A blend of 160 parts of a high density polyethylene having an RSV of 1.5 as determined in decahydronaphthalene at a temperature of 135° C. and 40 parts of a polysiobutylene having an average molecular weight of 100,000 was prepared by blending on a two roll mill at a temperature of 127° C. To the blend was added, dropwise over a period of 5 minutes, 2 parts of tetramethylene bis(azidoformate) dissolved in ethylene dichloride. A sample was removed from the mill, placed in a mold and cured for 10 minutes at a temperature of 170° C. under a pressure of 800 p.s.i. The resulting vulcanizate had a percent gel of 93.7 and a percent swell of 630. The properties of the vulcanizate were as follows:

| | |
|---|---|
| Tensile strength, p.s.i. | 2110 |
| Young's modulus, p.s.i. | 115,000 |
| Elongation, percent | 83 |

EXAMPLE 53

A sample of an ethylene-propylene copolymer having an RSV of 1.9, as determined in decahydronaphthalene at a temperature of 135° C. and containing 31 mole percent of propylene was cross-linked with tetramethylene bis (azidoformate). Quartz equipment was used throughout the reaction. The azidoformate was added to a solution of the copolymer in toluene in an amount of 10 parts per hundred parts of copolymer, and the solvent was allowed to evaporate overnight, at room temperature. The sample was then irradiated for 2 hours with a low pressure mercury vapor light (36 watt) at a distance of 3.75 inches. At least 90% of the radiation given off by the light was at 2537 A. The resulting vulcanizate had a percent gel of 84 as determined in toluene at a temperature of 80° C. A sample of the ethylene-propylene copolymer treated in exactly the same way except for the addition of azidoformate was completely soluble in toluene at 80° C.

EXAMPLE 54

A sample of an amorphous polypropylene having an RSV of 0.78, as determined in decahydronaphthalene at a temperature of 135° C., was cross-linked with tetramethylene bis(azidoformate) exactly as described in Example 53. The resulting vulcanizate was substantially insoluble in toluene at a temperature of 80° C. while a sample of the polymer treated in exactly the same way except for the addition of the azidoformate was completely soluble in toluene at 80° C.

EXAMPLES 55–57

Three samples of different polymers were cross-linked with tetramethylene bis(azidoformate). Each polymer was dissolved in a solvent, chloroform in the case of poly(vinyl methyl ether) and ethylene dichloride in the case of the other two polymers, and the azidoformate was added to each solution in an amount of 10 parts per hundred parts of polymer. Each sample was poured on a glass plate and the solvent allowed to evaporate. The resulting thin (about 0.5 mil) films were each irradiated for 15 minutes with a low pressure mercury vapor light (36 watt) at a distance of $1^{15}/_{16}$ inches. The polymers cross-linked and the percent gel of each, as determined in ethylene dichloride at a temperature of 25° C. are tabulated below.

| | Percent gel |
|---|---|
| Poly(vinyl methyl ether) | 91 |
| Poly(ethylene oxide) | 70 |
| Hydroxypropyl cellulose | 90 |

EXAMPLES 58–60

Three samples of different elastomeric polymers were cross-linked with tetramethylene bis(azidoformate). The formulation of each sample was as follows:

| | Parts |
|---|---|
| Elastomeric polymer | 100 |
| High abrasion furnace black | 50 |
| Tetramethylene-bis(azidoformate) | 3 |

Each formulation was compounded on a two roll mill by conventional rubber procedure and then cured in a preheated aluminum mold at a temperature of 150° C. for 45 minutes. The resulting vulcanizates were odorless. The polymer cross-linked and the percent gel and swell of the resulting vulcanizates, as determined in toluene at 24° C., are tabulated below.

| Polymers | Gel | Swell |
|---|---|---|
| Polysulfide [1] | 94 | 290 |
| Polyurethane [2] | 91 | 330 |
| Ethyl acrylate-2-chloroethyl vinyl ether copolymer [3] | 87 | 374 |

[1] An organic polysulfide sold as Thiokol ST.
[2] Reaction product of toluene diisocyanate and a polyalkylene ether glycol.
[3] Containing approximately 95 mole percent ethyl acrylate.

EXAMPLE 61

This example demonstrates the cross-linking of a polyamide fiber. A sample of a "6,6-nylon" type polyamide fiber (840 denier; 140 filaments; 2 ply) was immersed in a 14.5% solution of 2,2-isopropylidene bis(p,p'-phenyl azidoformate) in ethylene dichloride. In addition to the cross-linking agent, the solution contained a small amount of phenol which acted as a swelling agent for the fiber. The fiber was soaked in the solution for 16 hours at a temperature of 52° C., then removed and air-dried. The thus treated fiber was heated in a closed container for 30 minutes at a temperature of 149° C. The fiber was tested for cross-linking by determining its solubility in an excess of formic acid at a temperature of 80° C. The fiber was insoluble after soaking for 4 hours while a sample treated exactly the same way except for the azidoformate completely dissolved.

EXAMPLE 62

A sample of polyester fiber, sold under the trademark "Dacron, type S" (1100 denier; 250 filaments; 3 ply), was immersed in a 16.6% solution of tetramethylene bis (azidoformate) in ethylene dichloride. In addition to the cross-linking agent, the solution contained a small amount of phenol which acted as a swelling agent for the fiber. The fiber was soaked in the solution for 16 hours at a temperature of 52° C., then removed and air-dried. The thus treated fiber was heated in a closed container for 30 minutes at a temperature of 149° C. The fiber was tested for cross-linking by determining its solubility in an excess of p-cresol at a temperature of 145° C. The fiber was insoluble after soaking for 64 hours while a sample treated exactly the same way except for the azidoformate completely dissolved.

EXAMPLE 63

This example demonstrates the cross-linking and dyeing of an ethylene-propylene copolymer with a dye synthesized to contain an azidoformate group. To a toluene solution of an ethylene-propylene copolymer, containing 31 mole per cent propylene and having an RSV of 1.9, as determined in decahydronaphthalene at a temperature of 135° C., was added 17 parts per hundred parts of copolymer of p-phenylazophenyl azidoformate. The solvent was allowed to evaporate overnight at room temperature. The resulting bright orange rubbery material was heated in a closed iron mold for one hour at 130° C. The bright orange vulcanizate was tested for cross-linking and fastness of color by continuous extraction with an excess of tetrachloroethylene for 7 hours at room temperature. The vulcanizate was color fast and insoluble. A sample of the copolymer treated in the same way except for the addition of p-phenylazophenyl azidoformate was white and completely dissolved in the tetrachloroethylene.

EXAMPLES 64–66

Samples of three different polymer compositions were cross-linked with azidoformate exactly as described in Examples 47–50. The formulation of each sample is tabulated below.

EXAMPLE 64

Ingredients: Parts
Vinyl chloride-vinyl acetate copolymer _____ 20
Butyl acetate _____ 80
Tetramethylene bis(azidoformate) _____ 20

EXAMPE 65

Ingredients: Parts
Poly(vinyl butyral) _____ 20
Ethanol _____ 80
2,2-isopropyl bis(p,p'-phenylazidoformate) ____ 10

EXAMPLE 66

Ingredients: Parts
Vinylidene chloride-acrylonitrile copolymer ____ 20
Methyl ethyl ketone _____ 80
Tetramethylene bis(azidoformate) _____ 10

Three control samples were prepared and treated exactly the same way except the azidoformate was omitted from each formulation. The compositions and controls were all tested for cross linking by determining their solubility in an excess of the solvent in which they were applied, i.e., butyl acetate in Example 64, ethanol in Example 65, and methyl ethyl ketone in Example 66. In each example the control was soluble and the composition containing the azidoformate insoluble after soaking for 18 hours.

EXAMPLE 67

A blend of polyisobutylene and crystalline polypropylene containing 15% by weight of polyisobutylene was modified as follows: The polyisobutylene and polypropylene were compounded on a two-roll mill until a uniform blend was obtained. Then an amount of 50% tetramethylene bis(azidoformate) dispersed in finely pulverized silica equivalent to 0.025% by weight of pure azidoformate, based on the blended polymers, was added to the mill and compounded for approximately 1 minute at a temperature of 120° C. The resulting mixture was heated in a closed iron mold at a temperature of 160° C. for 20 minutes under a pressure of 1,000 p.s.i. The thus modified blend was compared to a control blend treated in exactly the same way except for the addition of the azidoformate. Both the modified blend and the control were soluble in hot decahydronaphthalene, but the impact strength of the modified blend as measured at −10° C. was approximately 10 ft. lbs./sq. in. higher than the control.

What I claim and desire to protect by Letters Patent is:

1. The process of modifying a polymer selected from the group consisting of hydrocarbon polymers, cellulose esters, cellulose partial alkyl ethers, condensation products of a dibasic acid and a polyhydric alcohol, poly (alkylene oxides), polyamides, esters of allyl pentaerythritol with a fattty acid, condensation products of triallyl pentaerythritol and diallylidene pentaerythritol, poly(vinyl alkyl ethers), poly(vinyl acetals), poly(vinyl chloride), vinyl chloride-vinyl acetate copolymers, vinyl chloride-vinylidene chloride copolymers, vinyl chloride-maleic anhydride copolymers, vinyl chloride-fumaric acid copolymers, vinyl chloride-vinyl acetal copolymers, vinyl chloride-vinylidene chloride-acrylonitrile terpolymers, vinyl chloride-vinyl acetate-maleic anhydride terpolymers, nitrocellulose, chlorinated natural rubber, polysulfides, polyurethanes, poly(vinyl acetate), ethylene-vinyl acetate copolymers, poly(vinylidene chloride), vinylidene chloride - acrylonitrile copolymers, ethyl acrylate–2-chloroethyl vinyl ether copolymers, poly(ethyl acrylate), poly(ethyl methacrylate), poly[3,3 -bis(chloromethyl) oxetane], vinyl modified polydimethyl-siloxanes, polychloroprene, butadiene-acrylonitrile copolymers, and sulfochlorinated polyethylene which comprises irradiating said polymer in admixture with a small amount of an azidoformate having a boiling point of at least about 100° C. at a pressure of 70 mm. of mercury and having the general formula

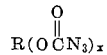

where $x$ is an integer of from about 1 to about 4 and R is an organic radical inert to said polymer, at a wave length between about 1 A. and about 5800 A.

2. A polymer selected from the group consisting of hydrocarbon polymers, condensation products of a dibasic acid and a polyhydric alcohol, cellulose esters, cellulose partial alkyl ethers, polyesters, poly(alkylene oxides), polyamides, esters of allyl pentaerythritol with a fatty acid, condensation products of triallyl pentaerythritol and diallylidene pentaerythritol, poly(vinyl alkyl ethers), poly(vinyl acetals), poly(vinyl chloride), vinyl chloride-vinyl acetate copolymers, vinyl chloride-vinylidene chloride copolymers, vinyl chloride-maleic anhydride copolymers, vinyl chloride-fumaric acid copolymers, vinyl chloride-vinyl acetal copolymers, vinyl chloride-vinylidene chloride-acrylonitrile terpolymers, vinyl chloride-vinyl acetate-maleic anhydride terpolymers, nitrocellulose, chlorinated natural rubber, polysulfides, polyurethanes, poly(vinyl acetate), ethylene-vinyl acetate copolymers, poly(vinylidene chloride), vinylidene chloride-acrylonitrile copolymers, ethyl acrylate–2 - chloroethyl vinyl ether copolymers, poly(ethyl acrylate), poly(ethyl methacrylate), poly[3,3-bis(chloromethyl)oxetane], vinyl modified polydimethylsiloxanes, polychloroprene, butadiene-acrylonitrile copolymers, and sulfochlorinated polyethylene, modified by irradiating said polymer in admixture with an azidoformate having a boiling point of at least about 100° C. at a pressure of 70 mm. of mercury and having the general formula

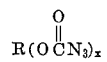

where $x$ is an integer of from about 1 to about 4 and R is an organic radical inert to said polymer, at a wave length between about 1 A. and about 5800 A.

3. The process of modifying a polymer selected from the group consisting of hydrocarbon polymers, cellulose esters, cellulose partial alkyl ethers, condensation products of a dibasic acid and a polyhydric alcohol, poly(alkylene oxides), polyamides, esters of allyl pentaerythritol with a fatty acid, condensation products of triallyl pentaerythritol and diallylidene pentaerythritol, poly(vinyl alkyl ethers), poly(vinyl acetals), poly(vinyl chloride), vinyl chloride-vinyl acetate copolymers, vinyl chloride-vinylidene chloride copolymers, vinyl chloride-maleic anhydride copolymers, vinyl chloride-fumaric acid copolymers, vinyl chloride-vinyl acetal copolymers, vinyl chloride-vinylidene chloride-acrylonitrile terpolymers, vinyl chloride-vinyl acetate-maleic anhydride terpolymers, nitrocellulose, chlorinated natural rubber, polysulfides, polyurethanes, poly(vinyl acetate), ethylene-vinyl acetate copolymers, poly(vinylidene chloride), vinylidene chloride-acrylonitrile copolymers, ethyl acrylate–2-chloroethyl vinyl ether copolymers, poly(ethyl acrylate), poly(ethyl methacrylate), poly[3,3 - bis(chloromethyl)oxetane], vinyl modified polydimethylsiloxanes, polychloroprene, butadiene acrylonitrile copolymers, and sulfochlorinated polyethyene which comprises heating said polymer at an elevated temperature with a small amount of an azidoformate having a boiling point of at least about 100° C. at a pressure of 70 mm. of mercury and having the general formula

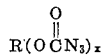

where $x$ is an integer of from about 1 to about 4 and R is an organic radical inert to said polymer.

4. The process of claim 3 wherein the polymer is a hydrocarbon polymer.

5. The process of claim 4 wherein the hydrocarbon polymer is an ethylene-propylene copolymer.

6. The process of claim 4 wherein the hydrocarbon polymer is an ethylene-propylene-dicyclopentadiene terpolymer.

7. The process of claim 4 wherein the hydrocarbon polymer is polyethylene.

8. The process of claim 4 wherein the hydrocarbon polymer is a styrene-butadiene copolymer.

9. The process of claim 4 wherein the hydrocarbon polymer is polypropylene.

10. The process of claim 3 wherein the polymer is a blend of hydrocarbon polymers.

11. The process of claim 3 wherein the polymer is chlorinated natural rubber.

12. The process of claim 3 wherein the polymer is poly(vinyl chloride).

13. The process of claim 3 wherein the polymer is polychloroprene.

14. The process of claim 3 wherein the polymer is a poly(alkylene oxide).

15. The process of claim 3 wherein the azidoformate is tetramethylene-bis(azidoformate).

16. The process of claim 3 wherein the azidoformate is 1,4-cyclohexanedimethyl-bis(azidoformate).

17. The process of claim 3 wherein the azidoformate is 2-(1-p-menthyl-8-yloxy)ethyl azidoformate.

18. The process of claim 3 wherein the azidoformate is $\alpha,\alpha'$-p-xylylene-bis(azidoformate).

19. The process of claim 3 wherein the polymer is cross-linked by said modification.

20. A polymer selected from the group consisting of hydrocarbon polymers, cellulose esters, cellulose partial alkyl ethers, condensation products of a dibasic acid and a polyhydric alcohol, poly(alkylene oxides), polyamides, esters of allyl pentaerythritol with a fatty acid, condensation products of triallyl pentaerythritol and diallylidene pentaerythritol, poly(vinyl alkyl ethers), poly(vinyl acetals), poly(vinyl chloride), vinyl chloride-vinyl acetate copolymers, vinyl chloride-vinylidene chloride copolymers, vinyl chloride-maleic anhydride copolymers, vinyl chloride-fumaric acid copolymers, vinyl chloride-vinyl acetal copolymers, vinyl chloride-vinylidene chloride-acrylonitrile terpolymers, vinyl chloride-vinyl acetate-maleic anhydride terpolymers, nitrocellulose, chlorinated natural rubber, polysulfides, polyurethanes, poly(vinyl acetate), ethylene-vinyl acetate copolymers, poly(vinylidene chloride), vinylidene chloride-acrylonitrile copolymers, ethyl acrylate–2-chloroethyl vinyl ether copolymers, poly(ethyl acrylate), poly(ethyl methacrylate), poly[3,3-bis(chloromethyl)oxetane], vinyl modified polydimethylsiloxanes, polychloroprene, butadiene - acrylonitrile copolymers, and sulfochlorinated polyethylene, chemically modified by treatment with an azidoformate having a boiling point of at least about 100° C. at a pressure of 70 mm. of mercury and having the general formula

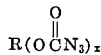

where $x$ is an integer of from about 1 to about 4 and R is an organic radical inert to said polymer at an elevated temperature.

References Cited by the Examiner

UNITED STATES PATENTS

| | | | |
|---|---|---|---|
| 2,115,275 | 4/1938 | Moran et al. | 260—349 |
| 2,764,599 | 9/1956 | Clifford et al. | 260—349 |
| 3,135,771 | 6/1964 | Renckhoff et al. | 260—349 |
| 3,137,745 | 6/1964 | Johnstone | 264—98 |

OTHER REFERENCES

Schwyzer et al.: "Helvetica Chimica Acta," vol. 42, Dec. 1, 1959, pp. 2622–4.

Weygand et al.: "Berichte der Deutschen Chemischen Gesellschaft," vol. 95, Jan. 25, 1962, pp. 1–6.

JOSEPH L. SCHOFER, Primary Examiner.

SAMUEL H. BLECH, Examiner.

L. EDELMAN, Assistant Examiner.